United States Patent Office 3,832,259
Patented Aug. 27, 1974

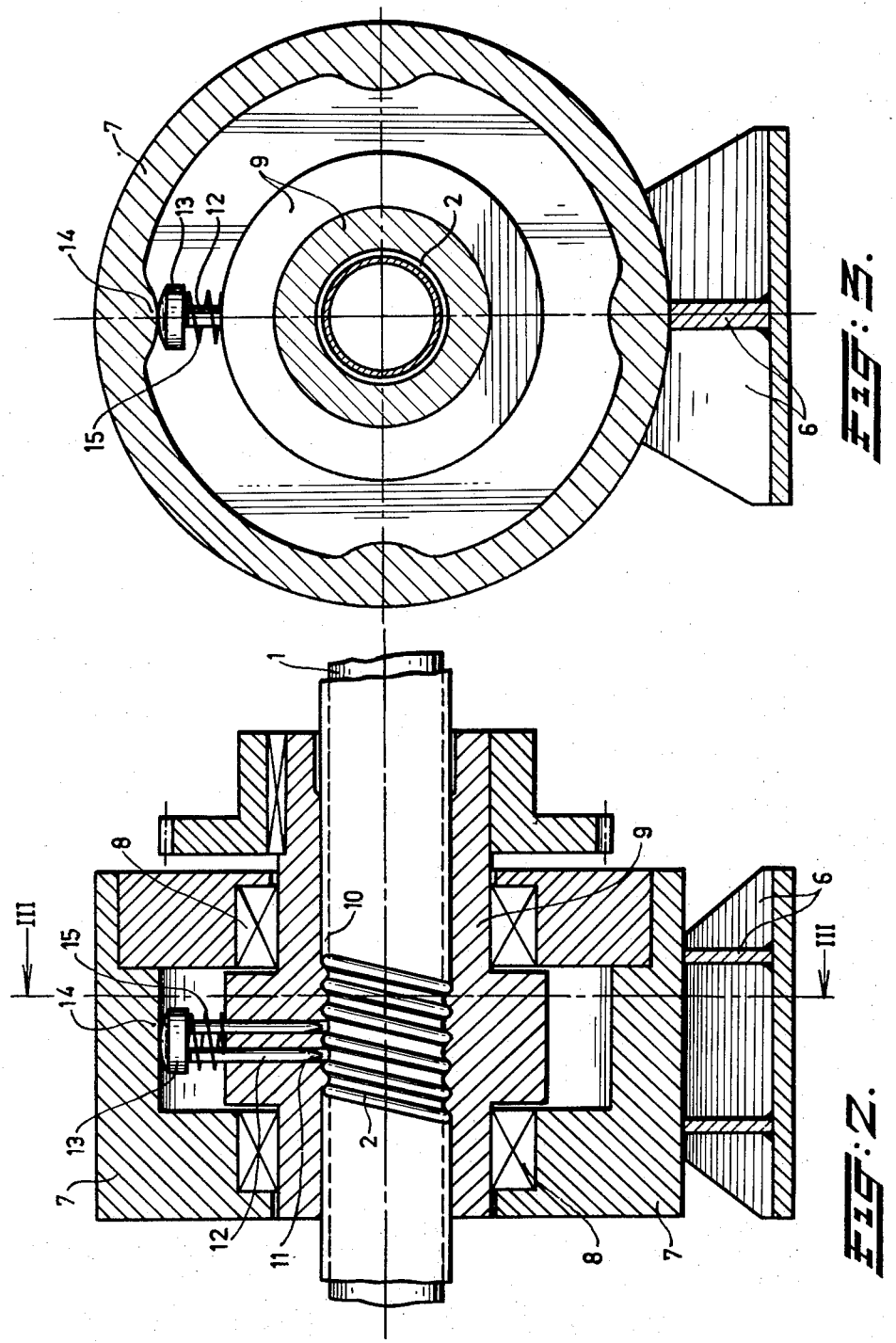

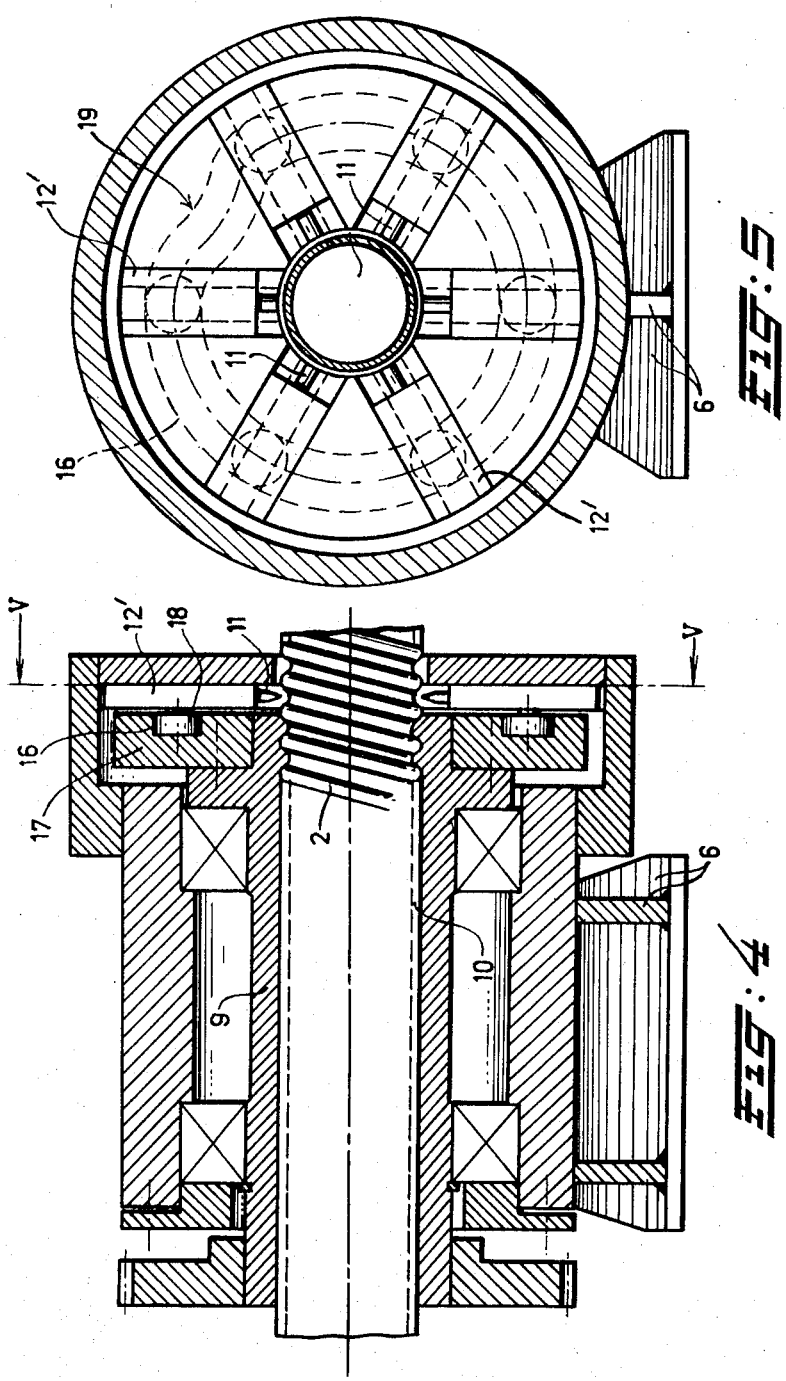

---

3,832,259
METHOD FOR MANUFACTURING A TRANSVERSELY OR HELICALLY GROOVED PLASTIC TUBE WITH A SMOOTH INNER WALL
Cornelis van Zon, Zwolle, Netherlands, assignor to Industeiele Ondeeneming Wavin N.V., Zwolle, Netherlands
Continuation-in-part of abandoned application Ser. No. 860,205, Sept. 23, 1969. This application Jan. 10, 1972, Ser. No. 216,587
Claims priority, application Netherlands, Sept. 30, 1968, 6813975
Int. Cl. B29d 3/00
U.S. Cl. 156—293       6 Claims

ABSTRACT OF THE DISCLOSURE

The invention relates to a method of manufacturing a composite plastic tube whereby an inner plastic tube with a smooth inner wall is positioned into an outer plastic tube provided with transverse or helical grooves and pins are acting upon part of the valleys of the outer tube. In this way the inner and outer tube are deformed and connected in a non-slidable way.

---

This is a continuation-in-part of my prior application 860,205, filed Sept. 23, 1969, now abandoned.

BACKGROUND OF THE INVENTION

The invention relates to a method for manufacturing a corrugated composite plastic tube with a smooth inner wall and transverse grooves on its outer side.

It is known in the art to manufacture these composite tubes but the connection is always performed by means of a mandril positioned in the inner tube. The presence of a mandril, however, increases the time for connecting the tubes in a non-slidable way by locally deforming or heating of the tubes by means of pinlike members. Moreover it is rather difficult to maintain the mandril in a proper position during continuous working of the tube for connecting the outer and inner tube in a non-slidable way.

SUMMARY OF THE INVENTION

It is now an object of the invention to provide a method for manufacturing an improved composite thermoplastic tube having a smooth inner wall and transverse grooves on the outer side, wherein the connection is performed very rapidly.

Another object is to provide a method for manufacturing an improved composite thermoplastic tube without using an inner mandril during the action of pinlike members onto a part of the valleys of a corrugated tube and the underlying part of the smooth tube in order to deform said parts in such a manner that a non-slidable connection is obtained.

A method for manufacturing a composite plastic tube from preformed inner and outer tubes, comprises the steps of positioning a formed inner tube having a smooth wall and made of plastic material into a length of a formed outer tube having transverse grooves and also made of plastic material, the outer diameter of the inner tube being at least substantially equal to the smallest inner diameter of the outer tube, positioning said outer tube within a hollow mould in such a manner that the inner surface of said inner tube is free of support, said hollow mould having an inner diameter substantially equal to the largest diameter of the outer tube, and moving pinlike members disposed externally of said outer tube into engagement with the external surface of said outer tube in the region adjacent the bottoms of the grooves formed therein for imposing a pressing force onto said outer tube and for locally plasticizing the plastic material of said outer tube in the region of said pinlike members for fixedly connecting said outer tube to said inner tube.

The step of enclosing the outer tube in a hollow mould and subjecting the assembly in a hollow mould to the action of preferably heated pinlike members without supporting the inner side of the inner tube allows the production of the connection is less than one second.

In case of an inner and outer tube of thermoplastic material of a different nature, the pinlike members will only deform both tubes instead of welding.

In the present invention, the transverse grooves of the outer tube may comprise either closed circular grooves perpendicular to the tube axis or helically extending grooves.

The invention will now be clarified with reference to the drawing in which an embodiment of the invention is represented.

BRIEF DESCRIPTION

FIG. 2 is a device for fixedly connecting the transversely grooved tube with the smooth inner tube wherein the welding member; and FIGS. 3, 4 and 5 are sections of a modified embodiment of this device.

DESCRIPTION OF PREFERRED EMBODIMENTS

Figure 1:
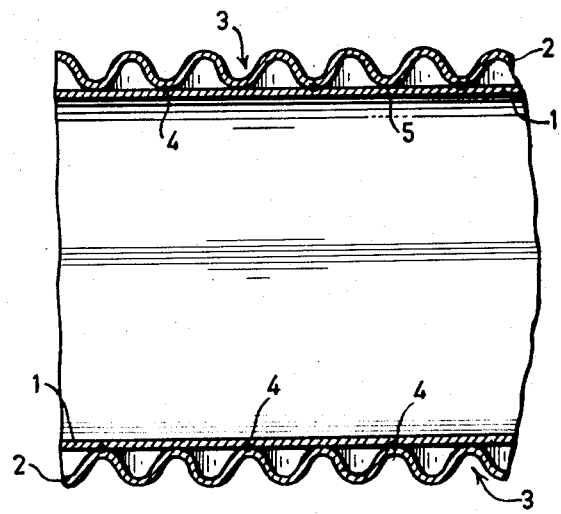
FIG. 1 and FIG. 1a show a section of an inner tube with smooth inner wall and a tube with transverse grooves affixed thereto.

For manufacturing a tube represented in FIG. 1, with a smooth inner wall with transverse grooves on its outer side, a corrugated tube 2 with transverse grooves is slid over the inner tube 1 with smooth inner wall. The smallest inner diameter of the tube 2 corresponds substantially with the outer diameter of the plastic tube 1 having a smooth inner wall. However, the outer diameter of the plastic tube 1 may also be somewhat greater, e.g. 2 or 3 mm., than the smallest inner diameter of the tube 2.

The smallest inner diameter of the tube 2 with transverse grooves is at the region of the hollows 3. The transverse grooves in this embodiment are perpendicular to the tube axis and closed on themselves.

In order to fix the tube 2 with respect to the inner tube 1 the tube 2 with grooves is welded or connected in the region of the hollow 3, to the smooth plastic tube 1 whereby the points of attachment 4 are obtained. It is not necessary to weld or connect each wave hollow to the inner tube 1, with a smooth inner wall, but in practice this will be done indeed, so much the more since the finished tube should afterwords often be cut off to a particular length, so that in case each wave hollow were not secured the tube with transverse grooves could at particular locations become loose with respect to the inner tube.

For interconnecting a tube 2 with transverse grooves and the tube 1 with a smooth inner wall any desired welding or plastic plasticizing outfit can be used.

Figure 1A:
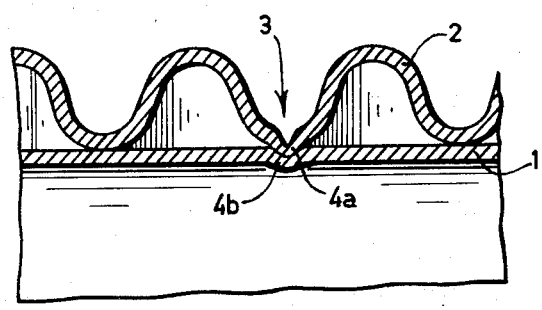

When however (as shown in FIG. 1a) two different plastics are used for the tube 2 with transverse grooves and the inner tube 1 with smooth inner wall no direct welded connection can be made, so that in that case one is compelled to apply a different method of fixing. This is preferably effected by pressing means of e.g. a heated pin plastic material 4a from the outer side of the tube 2 with transverse grooves into a cavity 4b in the outer wall of the smooth tube 1, which cavity has been simultaneously formed.

The attachment by welding or plasticizing of the tubes can very efficiently be effected by means of a device as represented in FIGS. 2 and 3. This device consists of a frame 6 carrying a stationary ring 7 in which by means of a ball bearing 8 a rotatable nut 9 is secured which serves as a guide member for the tube 2 with transverse grooves.

The inner wall 10 of the nut 9 is provided with a profile which corresponds with the profile of the tube 2 with transverse grooves. Fixed secured to the rotatable nut 9 are tube connecting members in the shape of heatable welding or plastic plasticizing pins 11. These welding pins 11 are provided on radially movable plungers 12 carrying a head 13. Operating cams 14 are provided on the stationary ring 7 for moving the plungers 12. It should be noted that in FIG. 2 the welding pins 11 are represented in a position just above the hollow of the plastic tube.

It should be noted that it is not necessary to use heated pins as a sudden action of a non-heated pin will always deform the plastic. Moreover during operation the pins are heated by the pushing action.

The device operates as follows. A tube 2 with transverse grooves, shaped in a tube moulding machine, such as an extruder, is introduced into the profiled part 10 of the rotatable nut 9, the rotatable nut being advantageously driven, via gear wheels, by the tube moulding machine whereby a synchronous process is achieved. The nut 9 with motion plunger 12, head 13 and heatable tube connecting member in the form of welding member 11 in the shape of pins rotate until the head 13 encounters the operating cam 14 whereby the plunger 12 is depressed and the heated welding pin deforms plastically both the wall of the tube 2 with transverse grooves and the wall of the tube 1 with a smooth inner wall. When the tube 2 with transverse grooves and the smooth tube 1 are of the same material they fuse the region of the point of contact 4. When the two materials are different e.g. a polyvinyl chloride inner tube and a polyethylene tube with transverse grooves, a part of the polyethylene tube is pressed into the cavity formed by the welding pin 11 into the wall of the smooth polyvinyl chloride inner tube where the impressed material serves as an anchoring means; in order to ensure the retraction of the plunger 12 same is urged outwardly by a spring 15.

FIGS. 4 and 5 represent another embodiment in which likewise again a frame with a rotatable nut 9 serving as a tube guide member is provided. The inner wall 10 of the nut 9 has a profile which corresponds with that of the tube 2 with the transverse grooves. This nut is connected with a disc 17 provided with a non-circular cam groove 16. In this cam groove 16 can move a projection 18 connected with a stationary element 12'. When the nut 9 is rotated the disc 17 will also be taken along whereby also the projection 18 connected with the element is guided in the groove 16. For the purpose of depressing the element 12' the groove has a non-circular part 19. Due to the effect of this noncircular part 19, the element 12' will be depressed and through the welding pin 11 the wall of the tube with transverse grooves will be plasticized and deformed in that region, so that material of the tube 2 fuses with the wall of tube 1 or is pressed thereinto.

The tube, with smooth inner wall and inner hollow protruding parts constituting internal grooves, obtained in this way is especially advantageous in that plastic tubes of a large diameter can be manufactured whilst economizing on raw materials. Due to the combination of a tube with transverse grooves and an inner tube with a smooth inner wall, a much smaller thickness of wall suffices.

It should be noted that instead of an outer tube with transverse grooves it is also possible to dispose loose hollow sections on the inner tube whilst forming transverse grooves, each section being welded to the inner tube with a smooth inner wall.

The tube with the smooth inner wall may for instance be conveyed, simultaneously with the tube with transverse grooves, by rollers or be extruded.

It should be noted that the outer diameter of the inner tube may also be somewhat larger than the smallest inner diameter of the corrugated tube. In that case the inner tube is engaging clampingly the corrugated tube.

What I claim is:

1. A method for manufacturing a composite plastic tube from inner and outer tubes, comprising the steps of:
    providing a formed inner tube made of plastic material and having a smooth cylindrical wall;
    providing a formed outer tube made of plastic material and having transverse groove means formed therein, the outer diameter of said inner tube being at least substantially equal to the smallest inner diameter of said outer tube;
    positioning said inner tube within said outer tube with said inner tube being free of internal support so that the outer surface of said inner tube engages and is supported on said outer tube by the inner walls defining the bottoms of said groove means;
    positioning said outer tube within a hollow mold having an inner diameter substantially equal to the largest diameter of said outer tube for supporting said outer tube, said inner tube being free of internal support when said outer tube is supported within said hollow mold;
    providing a movable pinlike pressing member adjacent said hollow mold and disposed externally of said outer tube; and
    moving said pinlike pressing member into engagement with the external surface of said outer tube in the region adjacent the bottom of said groove means for imposing a pressing force onto said outer tube and for locally plasticizing the plastic material of said outer tube in the region of said pinlike pressing member for fixedly connecting said outer tube to said inner tube.

2. A method according to Claim 1, wherein said pinlike pressing member is disposed closely adjacent one axial end of said hollow mold and is moved radially inwardly relative to said mold for engaging the outer surface of said outer tube.

3. A method according to Claim 1, wherein said transverse groove means as formed on said outer tube is helical, and wherein said hollow mold is provided with an internal helical groove thereon compatible with the external helical groove means formed on said outer tube, and rotating said hollow mold for moving said outer tube axially through said mold.

4. A method according to Claim 1, including the steps of constraining said pinlike pressing member solely for radial movement relative to the longitudinally extending axis of said tubes, and camming said pressing member radially inwardly into engagement with the outer surface of said outer tube by rotating a cam member in surrounding relationship to said pressing member.

5. A method according to Claim 1, wherein said pinlike pressing member is heated.

6. A method according to Claim 5, wherein said inner and outer tubes are both formed from compatible thermoplastic materials.

References Cited
UNITED STATES PATENTS

| | | | |
|---|---|---|---|
| 2,898,941 | 8/1959 | Kilcup | 138—121 |
| 2,663,324 | 12/1953 | Fentress | 138—121 |
| 2,365,181 | 12/1944 | Fentress | 138—121 |
| 3,558,397 | 1/1971 | Clark | 156—290 |
| 2,551,631 | 5/1951 | Pearce | 156—273 |

CHARLES E. VAN HORN, Primary Examiner

C. WESTON, Assistant Examiner

U.S. Cl. X.R.

156—294, 423